United States Patent
Osher et al.

(10) Patent No.: US 9,927,107 B1
(45) Date of Patent: Mar. 27, 2018

(54) TRY-ME FEATURE USED WITH LIGHTED ANIMAL RESTRAINT

(71) Applicant: Nitey Leash, LLC, Mayfield Heights, OH (US)

(72) Inventors: John D. Osher, Ft. Lauderdale, FL (US); Joseph Hassan, Forest Hills, NY (US)

(73) Assignee: Nitey Leash, LLC, Mayfield Heights, OH (US)

(*) Notice: Subject to any disclaimer, the term of this patent is extended or adjusted under 35 U.S.C. 154(b) by 0 days.

(21) Appl. No.: 15/425,057

(22) Filed: Feb. 6, 2017

Related U.S. Application Data

(60) Provisional application No. 62/417,566, filed on Nov. 4, 2016.

(51) Int. Cl.

| | |
|---|---|
| *A01K 27/00* | (2006.01) |
| *B65D 25/54* | (2006.01) |
| *F21V 23/04* | (2006.01) |
| *B65D 25/22* | (2006.01) |
| *B65D 25/02* | (2006.01) |
| *B65D 5/66* | (2006.01) |

(Continued)

(52) U.S. Cl.
CPC ........ *F21V 23/0414* (2013.01); *A01K 27/003* (2013.01); *A01K 27/006* (2013.01); *B65D 5/66* (2013.01); *B65D 25/02* (2013.01); *B65D 25/22* (2013.01); *B65D 25/54* (2013.01); *F21L 4/02* (2013.01); *F21V 33/008* (2013.01); *H05B 37/0281* (2013.01)

(58) Field of Classification Search
CPC ............... F21V 23/0414; F21V 33/008; H05B 37/0281; F21L 4/02; B65D 25/02; B65D 5/66; B65D 25/22; A01K 27/00; A01K 27/003

See application file for complete search history.

(56) References Cited

U.S. PATENT DOCUMENTS

| | | |
|---|---|---|
| 504,055 A | 8/1893 | Shaw |
| 634,014 A | 10/1899 | Molloy |

(Continued)

FOREIGN PATENT DOCUMENTS

| | | |
|---|---|---|
| WO | WO 2013/184807 A1 | 12/2013 |

OTHER PUBLICATIONS

PCT/US 17/29684 International Search Report and written opinion, dated Aug. 1, 2017, ISA/US, Authorized Officer Lee W. Young, 10 pages.

(Continued)

*Primary Examiner* — Peggy Neils
(74) *Attorney, Agent, or Firm* — Fay Sharpe LLP; James E. Scarbrough

(57) ABSTRACT

An illuminated animal restraint includes an elongated leash having a housing having a selectively enabled light source. The light source has a try-me timer assembly which enables selectively sampling operation of the light source and enables continuous and intermittent operation of the light source. A try-me package is provided with an opening to allows the user to press a button to activate intermittent or "try-me" illumination of the leash without draining the power source and without removing the leash from the package. The continuous operation is activated by removing the leash from the package.

9 Claims, 8 Drawing Sheets

(51) Int. Cl.
*F21V 33/00* (2006.01)
*F21L 4/02* (2006.01)
*H05B 37/02* (2006.01)

(56) References Cited

U.S. PATENT DOCUMENTS

| | | | |
|---|---|---|---|
| 1,379,093 | A | 5/1921 | Freeberg |
| 1,879,991 | A | 9/1932 | Pratt |
| 4,270,491 | A | 6/1981 | Cox |
| 4,488,511 | A | 12/1984 | Grassano |
| 4,513,692 | A | 4/1985 | Kuhnsman et al. |
| 4,702,374 | A | 10/1987 | Kelner |
| 4,887,552 | A | 12/1989 | Hayden |
| 5,005,527 | A | 4/1991 | Hatfield |
| 5,523,927 | A * | 6/1996 | Gokey ................ A01K 27/006 362/103 |
| 5,558,044 | A | 12/1996 | Nasser, Jr. et al. |
| 5,850,807 | A | 12/1998 | Keeler |
| 5,887,550 | A * | 3/1999 | Levine ................ A01K 27/004 119/796 |
| 5,967,095 | A | 10/1999 | Greves |
| 6,000,083 | A | 12/1999 | Blaustein et al. |
| 6,178,579 | B1 | 1/2001 | Blaustein et al. |
| 6,189,693 | B1 | 2/2001 | Blaustein et al. |
| 6,311,837 | B1 | 11/2001 | Blaustein et al. |
| 6,330,949 | B1 | 12/2001 | DeRisio |
| 6,360,395 | B2 | 3/2002 | Blaustein et al. |
| 6,371,294 | B1 | 4/2002 | Blaustein et al. |
| 6,546,585 | B1 | 4/2003 | Blaustein et al. |
| 6,557,498 | B1 | 5/2003 | Smierciak et al. |
| 6,564,940 | B2 | 5/2003 | Blaustein et al. |
| 6,727,826 | B1 | 4/2004 | Ki Kwan et al. |
| 6,749,437 | B2 * | 6/2004 | Chan ................ A63H 3/50 206/459.1 |
| 6,836,917 | B2 | 1/2005 | Blaustein et al. |
| 6,840,655 | B2 | 1/2005 | Shen |
| 6,846,094 | B2 | 1/2005 | Luk |
| 6,857,924 | B2 | 2/2005 | Fu et al. |
| 6,932,216 | B2 | 8/2005 | Blaustein et al. |
| 7,410,197 | B2 | 8/2008 | Edwards |
| 7,530,334 | B1 | 5/2009 | Napolitano |
| 7,536,980 | B2 | 5/2009 | Cooper |
| 7,690,331 | B2 | 4/2010 | Hurwitz |
| 7,954,482 | B2 | 6/2011 | Castonguay et al. |
| 8,186,083 | B2 * | 5/2012 | Chua ................ G09F 27/00 345/58 |
| 8,371,896 | B2 * | 2/2013 | Baytman ................ A63H 3/50 206/775 |
| 8,382,310 | B2 | 2/2013 | Bologeorges |
| 9,545,084 | B2 | 1/2017 | Osher et al. |
| 9,603,341 | B2 * | 3/2017 | Scaba ................ A01K 27/006 |
| 2006/0221599 | A1 | 10/2006 | Hornsby et al. |
| 2008/0091097 | A1 | 4/2008 | Linti et al. |
| 2011/0000440 | A1 | 1/2011 | Mucerino, Jr. et al. |
| 2013/0134056 | A1 | 5/2013 | Buynak et al. |
| 2013/0333632 | A1 | 12/2013 | Osher et al. |

OTHER PUBLICATIONS

"Nite Dawg LED Pet Leash" Review (Nite Ize Customer "Dezi Byrd") Jan. 31, 2014 [Online] retrieved on Jun. 21, 2017, URL: http://www.niteize.com/product/Nite-Dawg-Leash.asp>, entire document, all images.

"Perfect for Night Walks, Easy to Turn on and Off, Highly Recommend." (Amazon Customer) (Sep. 3, 2017) [Online] retrieved on Jul. 11, 2017 <URL: https://www.amazon.com/Nitey-Leash-Glow-Dark-Pink/dp/B01M26B1BX/ref=sr_1_22?ie=UTF8&qid=1499707084&sr=8-22&keywords=illuminated+leash>, entire document, all images.

Web page for Jinhua Solid Tools Co., Ltd., 2 pages, dated Aug. 6, 2012.

Web page for Alibaba.com, 3 pages, dated Aug. 6, 2012.

* cited by examiner

TRY-ME FEATURE USED WITH LIGHTED ANIMAL RESTRAINT

CLAIM OF PRIORITY

This application claims priority to Provisional Patent Application Ser. No. 62/417,566 filed on Nov. 4, 2016, the entirety of which is hereby incorporated by reference.

BACKGROUND OF THE DISCLOSURE

The present disclosure relates to illuminated animal or pet restraints. More particularly, it relates to a "try me" feature used with illuminated pet leashes which are lighted by any suitable light source especially used for walking a pet or animal during dusk or nighttime hours to increase visibility as well as safety for both the pet and pet owner or walker in dark or dimly lit situations and environments.

There are several problems with some existing illuminated leashes. One problem with some lighted leashes is they are displayed on hooks or are exposed without any packaging. Some of these leashes do not have a try-me feature, so when the consumer turns on the light by pressing or sliding a button, they may forget to shut off the light thereby draining the battery. Then the leash is no longer demonstrable for other consumers who may wish to see the lighting feature before purchasing the leash.

A second problem is some lighted leashes may have a try-me feature but if they are not provided in a package or box, the user may pull out an insulator tab, thus rendering the try-me timer useless or ineffective. Again, a consumer could press the button to light the leash, and forget to shut it off, thus draining the battery precluding other consumers from using the lighting feature prior to purchase.

A third problem with some lighted leashes is they may be in packaging which does not provide any access to the lighting feature unless the leash is physically removed from the package. Thus, the consumer has no way to try or see the lighting feature while the leash is still in the store. This could also preclude a sale.

Thus, in these examples, there is no effective way to test or try the lighting feature without either: a) risking draining the power source by leaving the leash in a power on position; b) risking pulling of the insulator tab off the leash rendering the try-me timer useless; or c) having to physically remove the leash from a package.

Accordingly, there is a need for an illuminated animal leash which has a "try me" feature and incorporates unique "try me" packaging which allows the user to test or temporarily try the lighting feature and see the lighting feature while the leash is still in its packaging with an automatic shut-off period for the light and also allows the user to use the lighting feature for a longer period of time when the leash is removed from the packaging and which overcomes the above-mentioned deficiencies and others while providing better overall results.

SUMMARY OF THE DISCLOSURE

The present disclosure relates to animal or pet restraints. More particularly, it relates to a try-me feature and packaging for trying or testing the lighting feature for a pet or animal leash which is illuminated by any light sources especially used for walking a pet or animal at dusk or at night.

One embodiment of the disclosure is a lighted animal restraint including a selectively enabled light or lights having an in-packaging try-me feature for selective sampling of restraint operation before purchase, and time out circuits to time out or automatically shut off the try-me feature after a selected period of time such as five (5) seconds and an on-enabling circuit for the restraint.

Another embodiment of the disclosure is an activation button which is pushed down and activates the lighting feature for a short period of time during the try-me use while the leash remains in its package.

Another aspect of the disclosure is the handle has a "try-me" feature so a consumer can try the lighting feature at the point of purchase without draining the battery.

Another aspect of the disclosure is a unique "try-me" package which enables the user to try the lighting feature of the leash while still in its packaging.

Another embodiment of the disclosure is a button which is activated for normal use such as by removing or pulling a strip, or sliding or rotating the button after the leash is removed from its package.

In accordance with another embodiment of the disclosure, after the leash is removed from the packaging, the light feature can be activated and remain on for a certain period of time, during normal use.

In accordance with a preferred embodiment of the disclosure, an illuminated animal restraint including an elongated leash having a housing having a selectively enabled light source. The light source has a timer assembly which enables selectively sampling operation of the light source and enables continuous and intermittent operation of the light source.

In accordance with another preferred embodiment of the disclosure, the illuminated animal restraint includes an elongated leash having a first end having a handle and a second end having a hook. The handle includes a light source and a switch for selectively operating the light source between a first mode of continuous illumination and a second mode of try-me intermittent illumination.

Other aspects of the disclosure will become apparent upon a reading and understanding of the following detailed description.

DETAILED DESCRIPTION OF THE DISCLOSURE

With reference to FIGS. 1-8, a preferred embodiment of a lighted animal or pet restraint in the form of a leash is shown and described. The Figures illustrate a preferred embodiment of the disclosure only and the disclosure is not limited to the embodiments of the Figures. For example, the restraint may also include a collar in addition to a leash.

Figure 1:
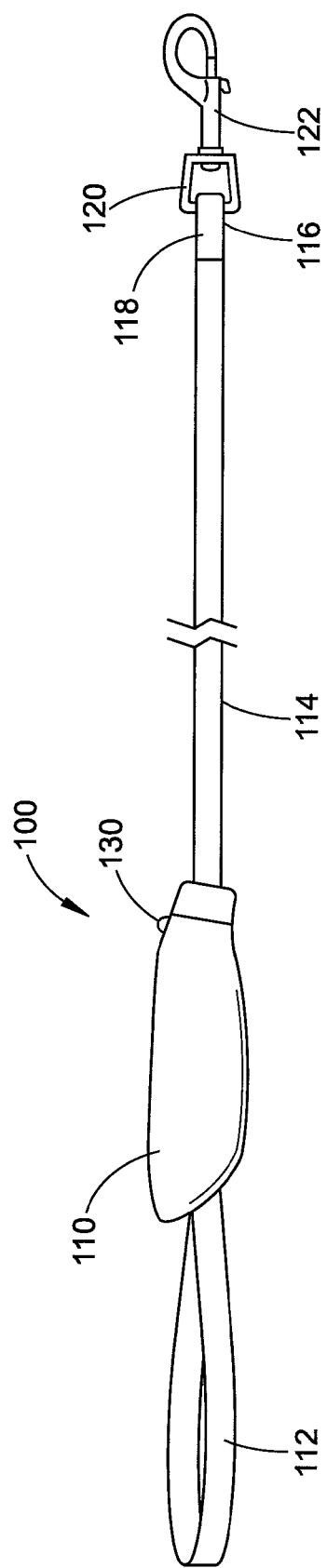
FIG. 1 is a side elevational view of the animal restraint in accordance with a preferred embodiment of the disclosure.
Figure 2:
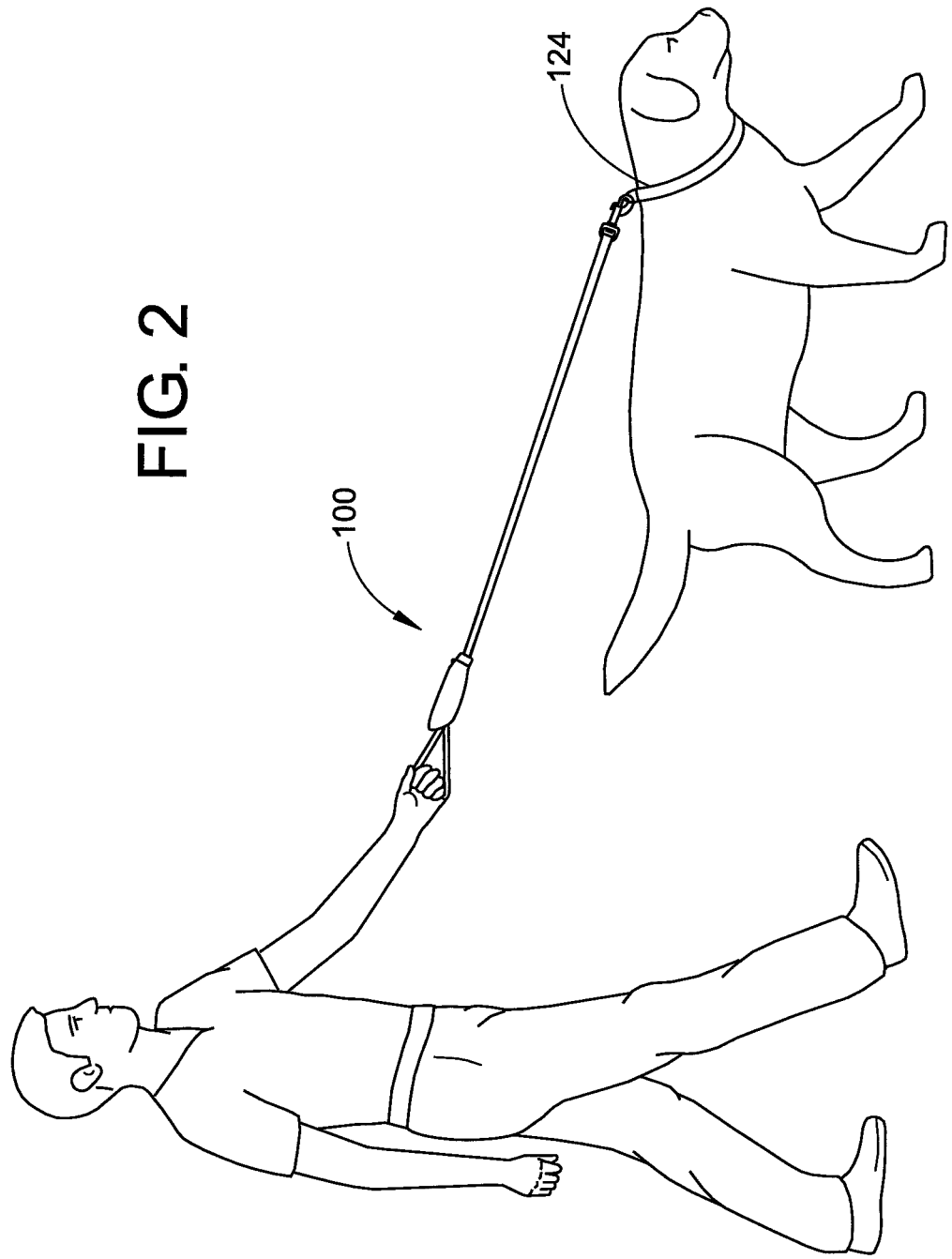
FIG. 2 is a side elevational view showing a user and the animal restraint of FIG. 1 being used with a pet.
Figure 3:
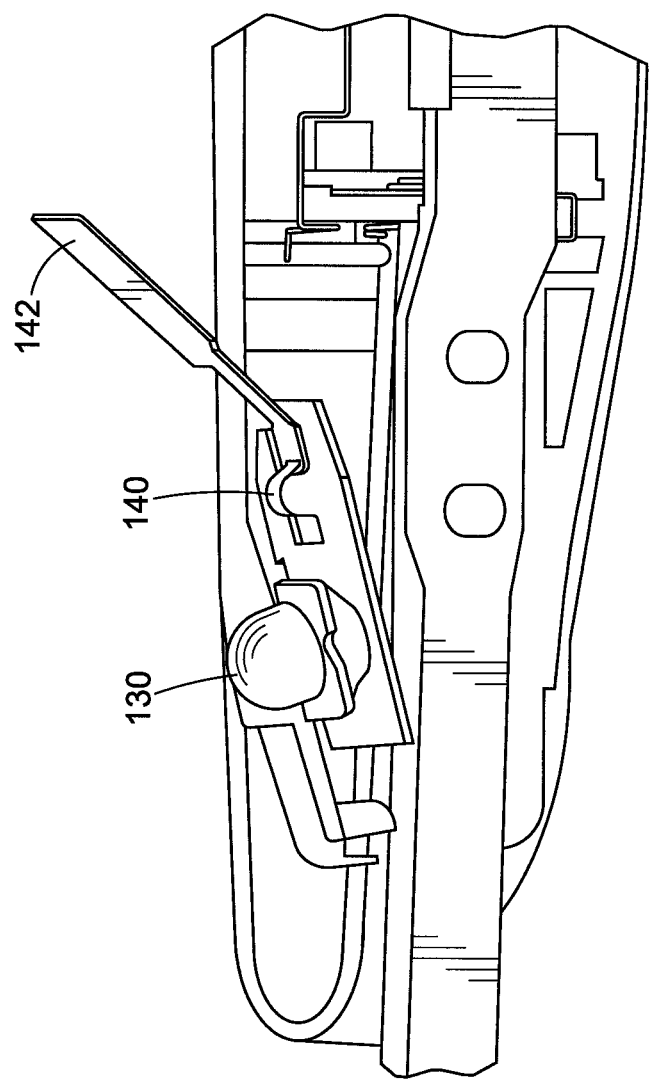
FIG. 3 shows aspects of a try-me enable sensor in a handle of an embodiment in the form of a leash.

Referring now to FIGS. 1 and 2, the physical embodiments of the restraint preferably include a leash 100 having a handle 110, a handle strap 112 connected to and extending from the handle and a lead or rope 114 extending from the handle. At an opposite end 116 of the rope is a loop 118 for holding a ring 120 of a metal lock hook 122 for attaching the leash to a collar 124 on an animal (see FIG. 2).

The handle strap 112 can be made of the same or different material as the rope 114. For instance, in some embodiments the handle strap can be leather or an imitation leather material such as vinyl. The handle strap and handle can cooperate to secure the leash in a hand of a user such as a pet walker. The length of the rope can be any desired length, such as, for example, three, four, five, six or more feet. Preferably, the length of the rope is about five feet. The rope is also preferably water resistant for rainy day use. The rope can be made of nylon thread and the lighting feature may be interweaved into the rope.

With reference to FIG. 1, it can be seen that the handle embodiment has an ergonomically designed shape so that a user can easily hold it and operate the illuminating function with only one hand by depressing button 130 on a top portion of the handle. The handle 110 preferably can have a textured surface to prevent slipping off of the hand of a user.

From an electrical or electronic standpoint, the restraint includes provisions for a power source (e.g., a battery 212, FIG. 6), a control switch, a try-me timer, a flasher circuit, a light source drive and a light.

Provisions for power source (e.g. batteries), as well as a try-me timer, flasher and a light source drive can also be housed internally within the handle. A printed circuit board assembly (PCBA) can control operation of the timer and light source.

The power source provision can include a chamber and electrical contacts for receiving batteries such as three AAA batteries. Other batteries such as C and/or D batteries could also be used in some embodiments. Other embodiments could allow for solar cell recharging of an energy storage device such as a battery or capacitor.

According to a preferred embodiment of the disclosure, the animal restraint has a try-me feature for trying the lighting feature while the leash is still in its package, such as for 5 seconds and then shutting off. Alternatively, the leash can be illuminated when the button is pushed or depressed and the lighting will shut off when the button is released. The try-me lighting feature can allow a short period of time (e.g. 5 seconds) for continuous illumination or flashing illumination before shutting off.

The try-me feature can be enabled by a sensor. For example, referring to FIG. 3, a try-me enable sensor can be a pair of electrical contacts 140. Contacts 140 can be separated by an insulator such as a paper or plastic insulator tab 142 while the lighted animal restraint is in display packaging. The act of removing the lighted animal restraint from the display packaging can remove the insulator tab 142 from between the contacts. Alternatively, a consumer might manually remove the pull tab 142 from between the contacts upon purchase and removed from the package and first use of the lighted animal restraint.

According to another aspect of the disclosure to activate a usual time period for use, the insulation tab is pulled and the button is pushed, the leash stays lit for a normal use period of time and may then shut off to save the life of the batteries. Other ways to activate the button for normal use lighting can be sliding the button from try-me position to the normal use position, or rotating the button from a try-me position to a normal use position.

Figure 4:
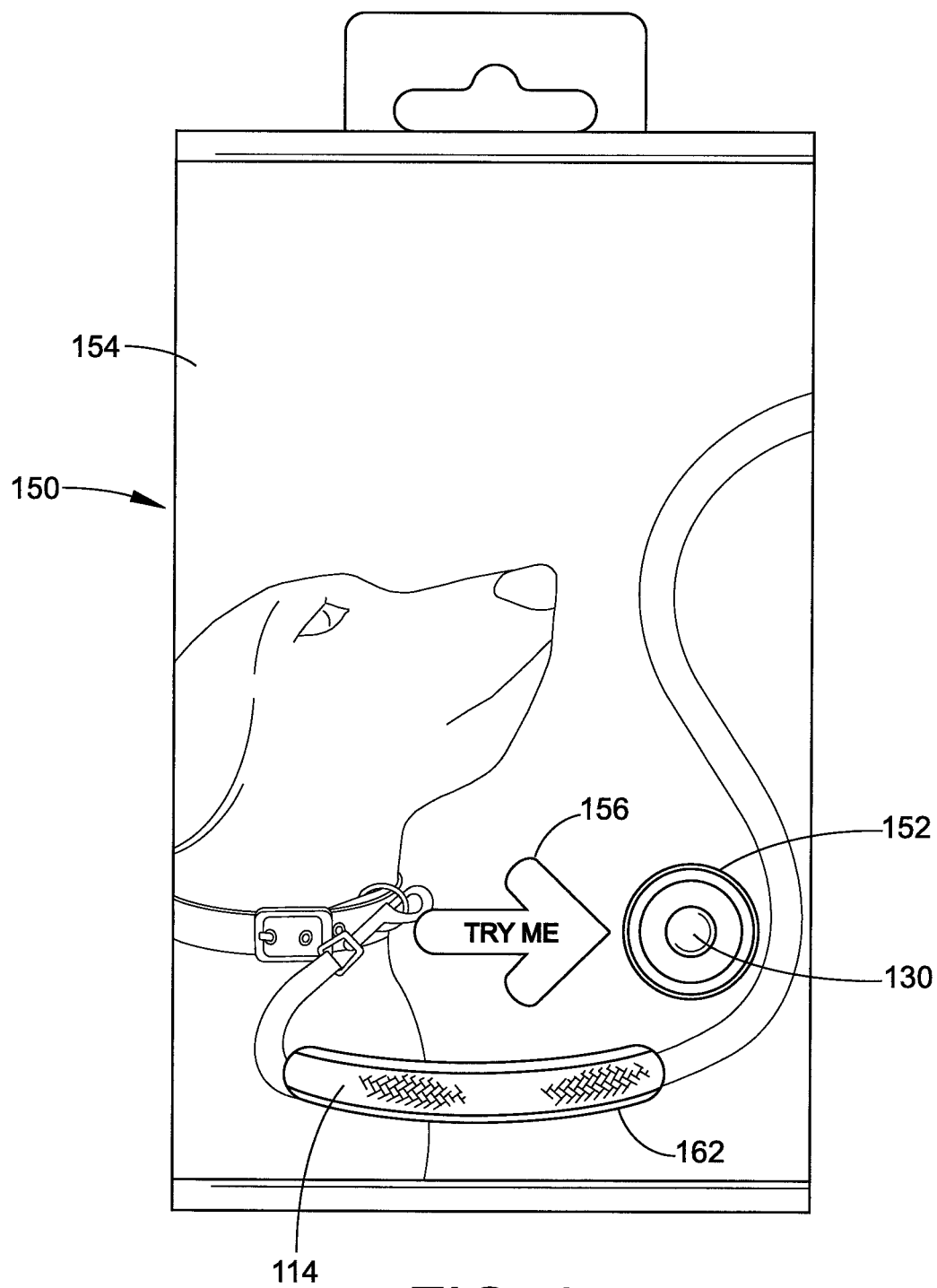
FIG. 4 is a front elevational view of a try-me package for an illuminated leash in accordance with a preferred embodiment of the disclosure.
Figure 5:
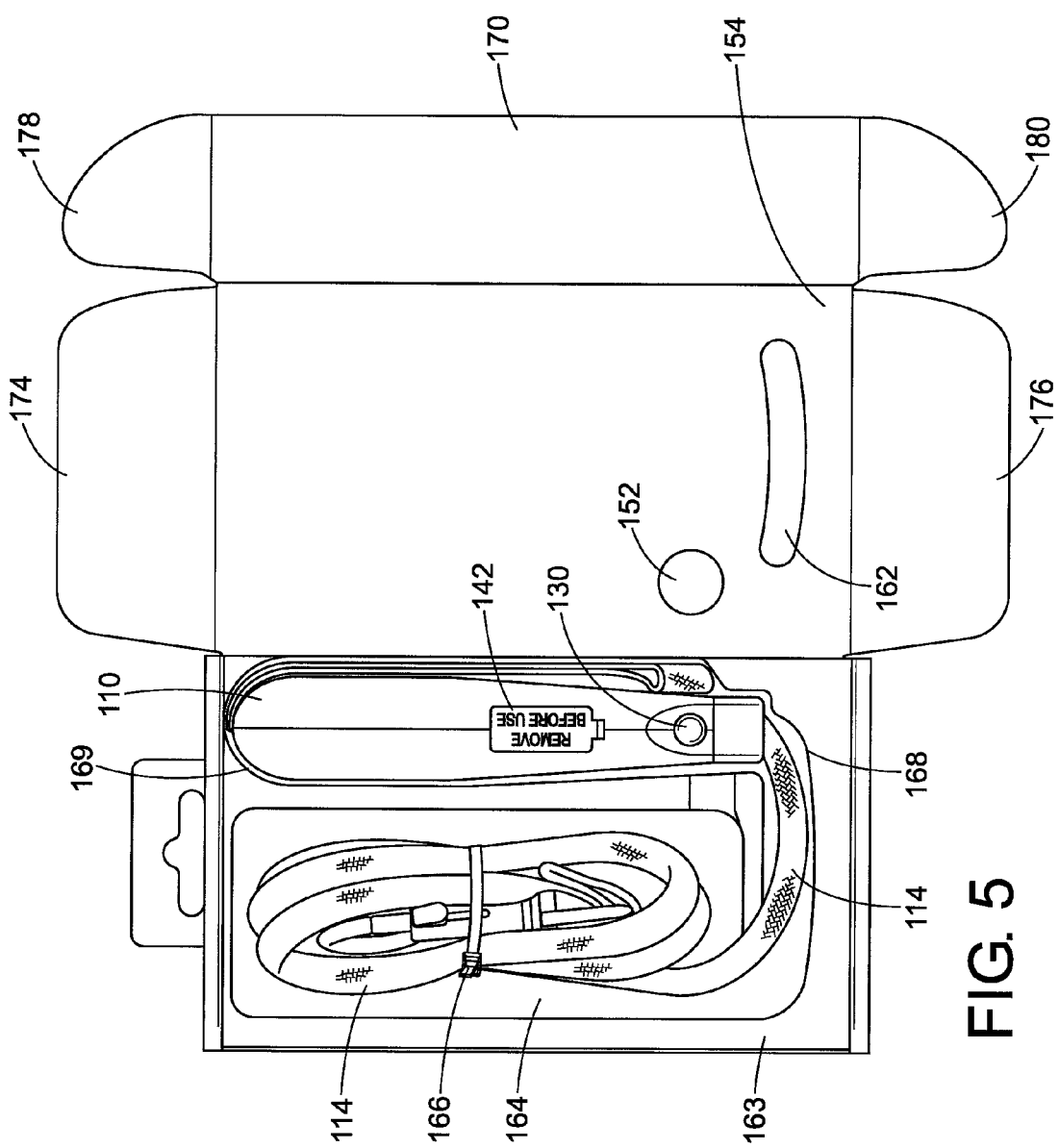
FIG. 5 is a front elevated view of the try-me package in an opened configuration.

Referring now to FIGS. 4 and 5, a try-me package or box 150 in accordance with a preferred embodiment of the disclosure is shown. The package shown is one of several ways of demonstrating the try-me feature on a package. Specifically, the package has an opening or hole 152 formed in front wall 154 which exposes the activation button 130 of the leash to the user. An arrow 156 with "try me" on a front wall 158 of the packaging can point to opening 152. A second opening 162 in the form of a curved or arcuate elongated opening exposes a portion of the leash rope 114 so the user can see the rope when it is illuminated.

Referring now to FIG. 5, an inner portion 163 of the box and a first compartment 164 houses the leash in a rolled and tied configuration such as by using a tie strap 166. The leash rope 114 is positioned in as elongated channel 168 such that a portion of the rope aligns with opening 162. A second parallel compartment 169 houses the handle 110 and positions the handle such that the button 130 aligns with opening 152. A side wall 170 is folded into compartment 164 while tabs 174, 176, 178, 180 extending from walls 154, 170 are bent into portion 163 when folding and closing the box. Note that tab 142 is not exposed until the box is opened.

Figure 6:
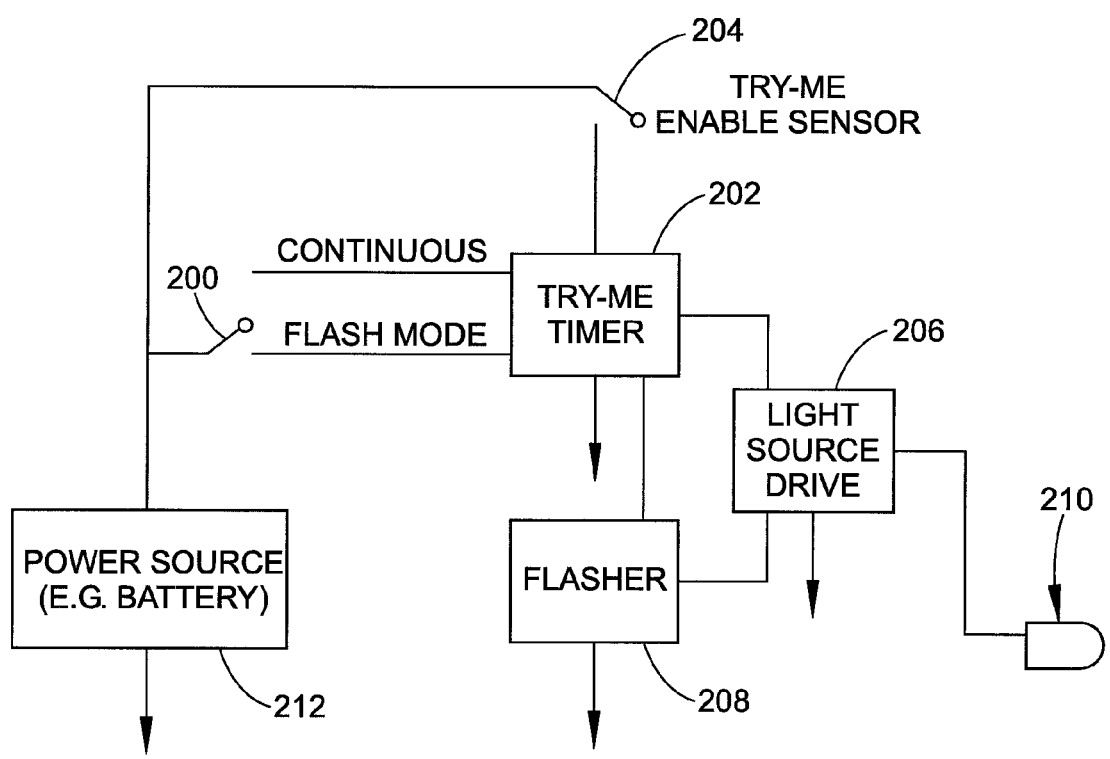
FIG. 6 is a block diagram of a lighted animal restraint in accordance with another embodiment of the disclosure.

Referring now to FIG. 6, in operation, for example, a first press, slide or twist or rotation of the control or button 130 places the leash in a first light mode such as a try-me or intermittent short time period mode (e.g. seconds) and a second press, slide or twist places the restraint in a second light mode such as a continuous longer period mode (e.g. minutes).

A control switch such as switch 200 (used with button 130) can be a multi-position switch or a switch that cycles between positions. One position is an open position for turning the animal restraint off (i.e., a de-powered state). A second position connects the power source provision to energize a try-me continuous or a try-me flash mode circuitry and a third position connects the power source to energize a continuous light mode circuit.

A try-me timer such as timer 202 can be enabled or disabled via a try-me enable sensor such as sensor 204. For instance, the try-me enable sensor senses that the lighted animal restraint is in its original packaging. When the try-me timer is enabled, the timer is triggered when the lighted animal restraint is placed in a try-me flash mode or a try-me continuous mode by the control switch. At the beginning of the timing cycle the try-me timer 202 provides power either directly to a light source drive 206 and light source 210 for continuous illumination or through flasher 208 for flashing illumination, depending on the position of the control switch 200. At the end of the timing cycle, power is removed from the flasher or light source drive.

When the insulator tab is removed and/or the try-me enable sensor 204 senses that the lighted animal restraint is no longer included in its original packaging, the try-me timer is bypassed and power is delivered to the light source drive 206 and light source 210 either directly or through the flasher according to the position of the control switch. The light source drive can receive power either from the try-me timer or from the flasher.

Power received from the try-me timer 202 is continuous as long as the enabled timer permits the power flow or as long as a disabled try-me timer and control switch 200 provide power. If power is received by the light source drive from the flasher, then the power received is intermittent according to a frequency and duty cycle selected for the flasher. The light source drive provides power to at least one light source 210. For example, the light source drive provides power at an appropriate voltage and/or current to the light source 210.

In another embodiment, many of the functions and modules can be embodied in a programmed microcontroller. For example, referring now to FIG. 7, a microcontroller 300, with programmed internal memory, provides the functions of the try-me timer 202, the flasher 208 and a portion of the function of the control switch 200.

Figure 8:
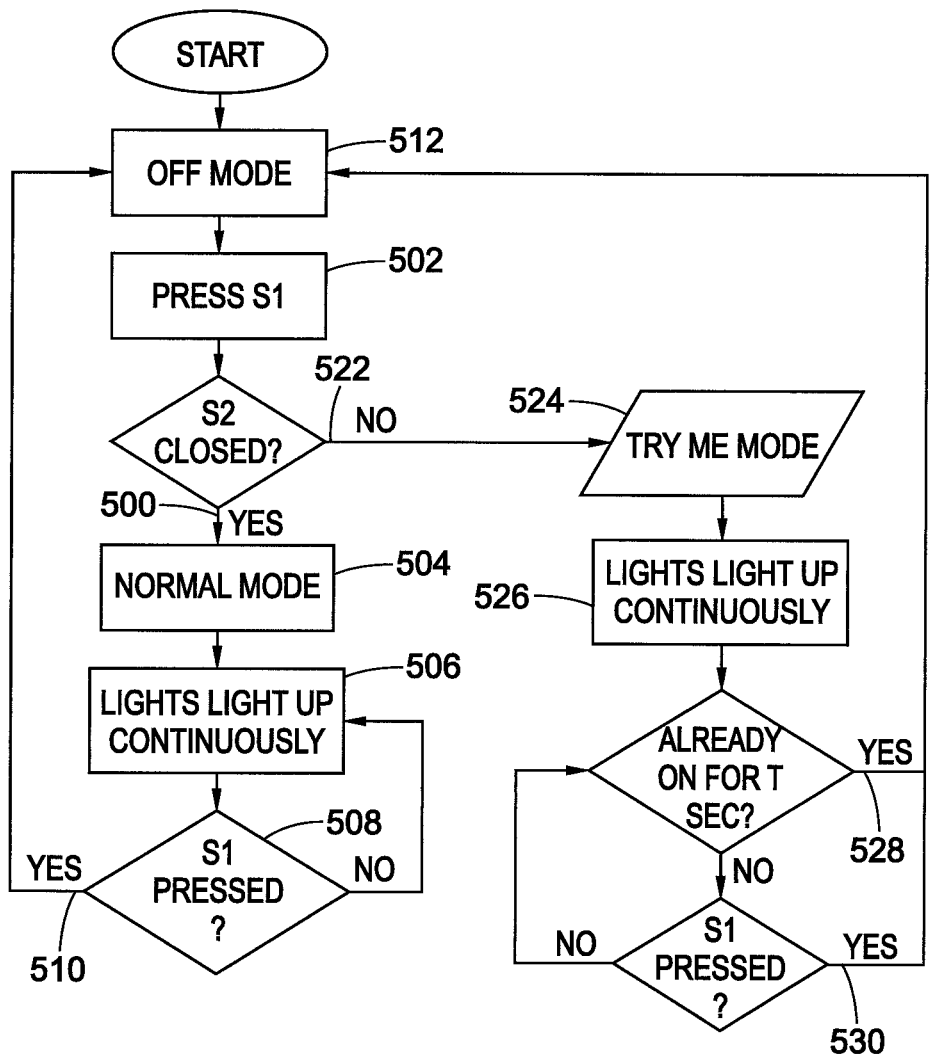
FIG. 8 is a flow chart outlining aspects of the operation of the circuit of FIG. 7.

For instance, a control button 302 (S1) is connected to an input 304 of the microcontroller. A second switch (S2) or set of electrical contacts (e.g., 306) is provided as a try-me enable sensor 308. Referring also to FIG. 8, if the try-me enable sensor 308 (S2) indicates (step 500) that the lighted restraint has been removed from its display packaging and has also been placed in a normal operation mode (e.g., by removal of an insulator tab) then the microcontroller 300 reacts to a first press (step 502) of the control button 302 (S1) by entering a normal mode (step 504) and producing (step 506) a signal to light a one or more light sources 210 continuously or intermittently (i.e. flashing). To shut off the light, control button 302 (S1) is again pressed.

If the switch or set of contacts (S1) of the try-me enable sensor are not closed (step 522) (e.g., if they are held open by an insulator tab or other mechanism), the microcontroller enters a try-me mode (step 524) wherein the microcontroller produces (step 526) a signal to light the light source(s) continuously for a short period of time T, such as five seconds. Other periods of time are contemplated by the disclosure. The try-me lighting feature can either light the lights continuously, or allow the lights to flash during the try-me period of time (e.g., see FIG. 6).

In try-me mode, the microcontroller provides the battery saving feature of the try-me timer of FIG. 5. That is, the microcontroller monitors the length of time that microcontroller produces (step 526) the signal to light the light source(s). After, for example, T seconds, such as five seconds, with no further input from the control button (S1), the microcontroller returns (step 528) the lighted restraint back to the off mode (step 512) unless the control button (S1) is pressed a second time before the 5 (five) seconds expire, in which case, the microcontroller returns (step 530) the lighted restraint back to the off mode earlier. In some embodiments the time set point is longer or shorter. In some embodiments, a flasher mode may be available, even in try-me mode (e.g. See FIG. 6).

In this way, the microcontroller embodies and performs the remaining part of the function of the control switch well as the function of the try-me timer when it is enabled.

Figure 7:
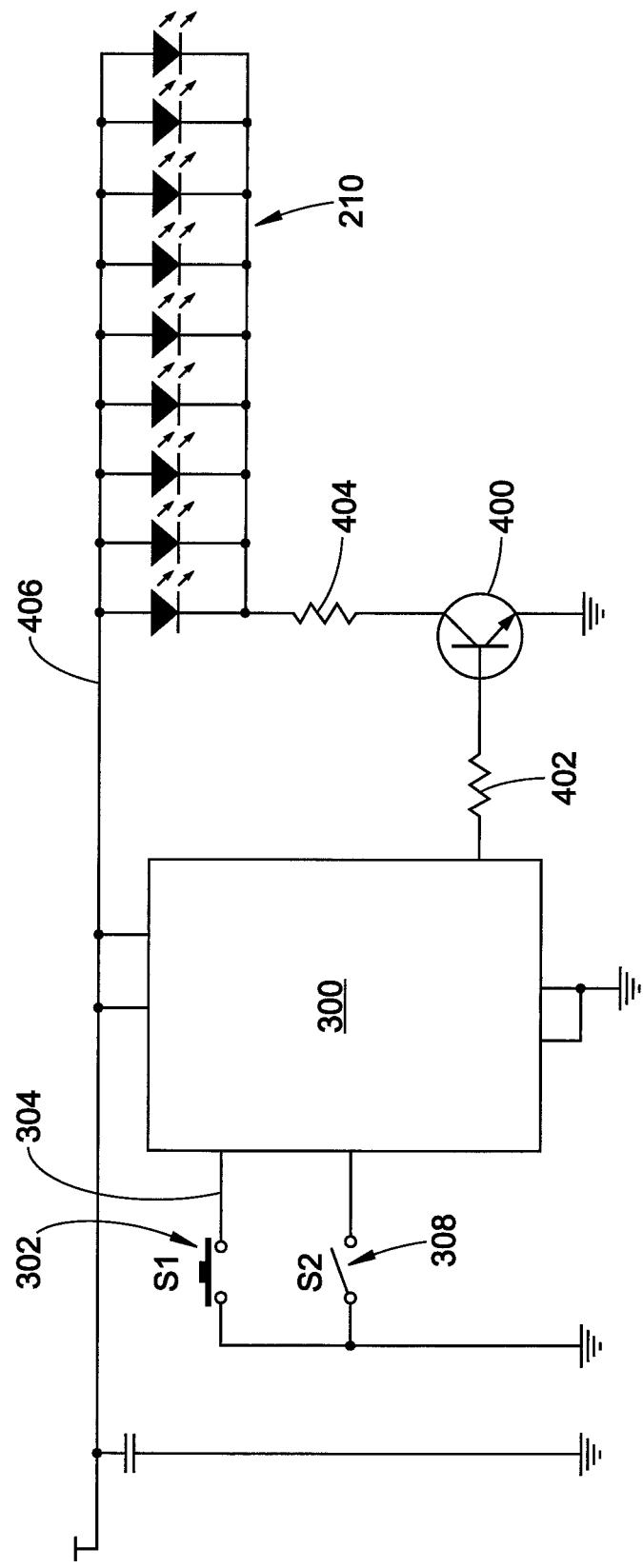
FIG. 7 is a schematic diagram of an embodiment of a circuit reflecting the block diagram of FIG. 6.

Referring to FIG. 7, in accordance with another embodiment of the disclosure, the light source can be embodied by a transistor 400, two resistors 402, 404 and a conductor 406 delivering electricity from a power source (e.g., a battery 212). When the microcontroller produces a signal (e.g., steps 506, 526) for lighting the light sources, a current, limited by first resistor 402 flows into the transistor 400 turning the transistor on or into a conducting state. This allows current to flow through the light sources, the second current limiting resistor 404 and the transistor toward a return line to the power source provision. When the signal (e.g., steps 506, 518, 526) is removed, either because the signal is intermittent (step 526) or because the lighted restraint has been returned to the off mode (step 512), current no longer flows through the first resistor 402, the transistor 400 is placed in an off state and significant current is prevented from flowing through the light sources, second resistor 404 and transistor 400.

Thus, according to one aspect of the disclosure, the animal restraint has a try-me feature for trying the lighting feature while the leash is still in its package, such as for 5 seconds and shutting off the lighting feature, this saving the batteries. Alternatively, the leash can be illuminated when the button is pushed and go off when the button is released.

According to another aspect of the disclosure, the try-me timer allows for a short period of continuous illumination or flashing illumination.

According to another aspect of the disclosure, when the leash is removed from the package, and/or an insulation tab is pulled and the button is pushed, the leash then stays lit for a normal period of use such as several minutes or more.

According to another aspect of the disclosure, a try me package is provided which has openings to expose the activating button and a portion of the leash to allow the user to see the lighting feature for the leash in a try-me mode.

According to another aspect of the disclosure, when the leash is removed from the package, the button is slid or rotated or a tab is pulled to activate a normal period of use of the lighting feature.

According to another aspect of the disclosure, an illuminated leash extension can be provided, which is used with existing, non-illuminated leashes and would be secured to the leash in a similar manner as a collar via a clip or the like.

The embodiments described above are illustrative only and are not meant to be limiting to the disclosures shown and described. Various other embodiments are encompassed or contemplated by the disclosure and the appended claims.

What is claimed is:

1. A try-me feature and packaging for use with an illuminated animal restraint, comprising:
    an elongated leash having a first portion and a second portion, said first portion comprising a light source and a switch for selectively operating said light source in a first mode of try-me intermittent illumination;
    a light transmitting member within said second portion of said leash; and
    a package having a first compartment for housing said second portion of said leash and a second compartment housing said first portion of said leash, and a wall positioned over said leash, said wall comprising a first opening for allowing access to said switch and a second opening allowing said second portion of said leash to be visible to the user to allow the user to view illumination of said leash.

2. The try-me package of claim 1, wherein said first mode of try-me intermittent illumination lasts about 5 seconds.

3. The try-me package of claim 1, wherein said switch is connected to a timer assembly which enables selectively sampling operation of said light source and enables said first mode for try-me intermittent operation of said light source.

4. The try-me package of claim 1, wherein said light source and said switch are powered by batteries.

5. The try-me package of claim 1, wherein a second mode of continuous illumination is activated by pulling an insulation tab from said leash.

6. The try-me package of claim 1, wherein a second mode of continuous illumination is activated by sliding said switch.

7. The try-me package of claim 1, wherein a second mode of continuous illumination is activated by rotating said switch.

8. The try-me package of claim 1, wherein said switch is able to operate said first mode of try-me intermittent operation when said leash is in said package.

9. The try-me package of claim 1, wherein said switch does not operate a second mode of continuous illumination until said package is opened.

\* \* \* \* \*